United States Patent [19]

Bunnell

[11] 4,030,801
[45] June 21, 1977

[54] ELECTRICAL CONNECTOR JUNCTION FOR CARPETED FLOOR

[75] Inventor: Edward Dennman Bunnell, Palm Harbor, Fla.

[73] Assignee: AMP Incorporated, Harrisburg, Pa.

[22] Filed: Aug. 24, 1976

[21] Appl. No.: 717,317

[52] U.S. Cl. .............................. 339/121; 174/48; 339/132 B
[51] Int. Cl.² ..................... H02G 3/08; H02G 3/10
[58] Field of Search ............... 174/48, 49; 220/3.2, 220/3.3, 3.4, 3.5, 3.8, 3.94; 339/39, 92, 119, 120, 121, 132

[56] References Cited

UNITED STATES PATENTS

| | | | |
|---|---|---|---|
| 3,597,523 | 8/1971 | Guritz | 174/48 |
| 3,934,072 | 1/1976 | Balde | 174/48 |

Primary Examiner—Roy Lake
Assistant Examiner—Neil Abrams

Attorney, Agent, or Firm—Frederick W. Raring; Robert W. Pitts; Jay L. Seitchik

[57] ABSTRACT

Electrical junction means for cables which are part of a telephone wiring system comprises a base frame member disposed on the floor of a building. Multi-conductor cables extend across the floor and have connectors on their ends which are mounted in the base frame member. The connectors mounted in the base frame member or mated with connectors on the ends of conventional cables which extend from the junction means to telephones. Carpeting material on the floor extends up to the base frame member and flaps of carpeting are located on top of the base frame member. A cover member is secured by fasteners to the base frame member and serves to protect the connectors therein. The cover member is clamped against the carpet flaps and against portions of the carpeting which are immediately adjacent to the base frame member. This arrangement provides a self-gaging feature which reduces the tendency of the cover member to become loose.

5 Claims, 8 Drawing Figures

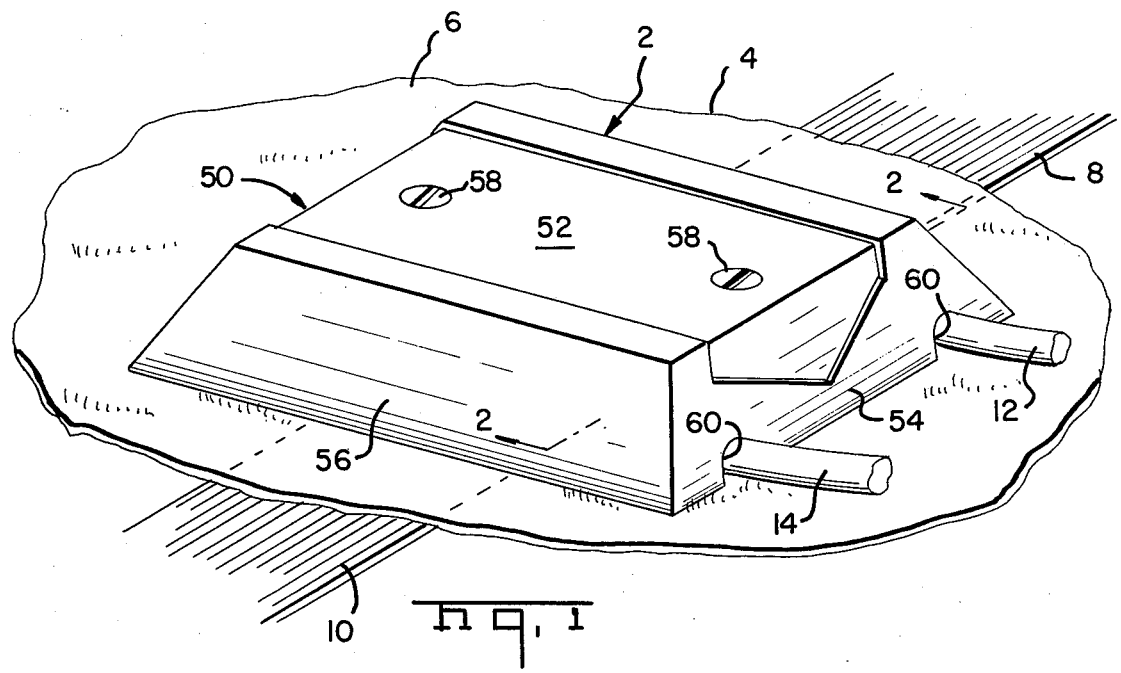
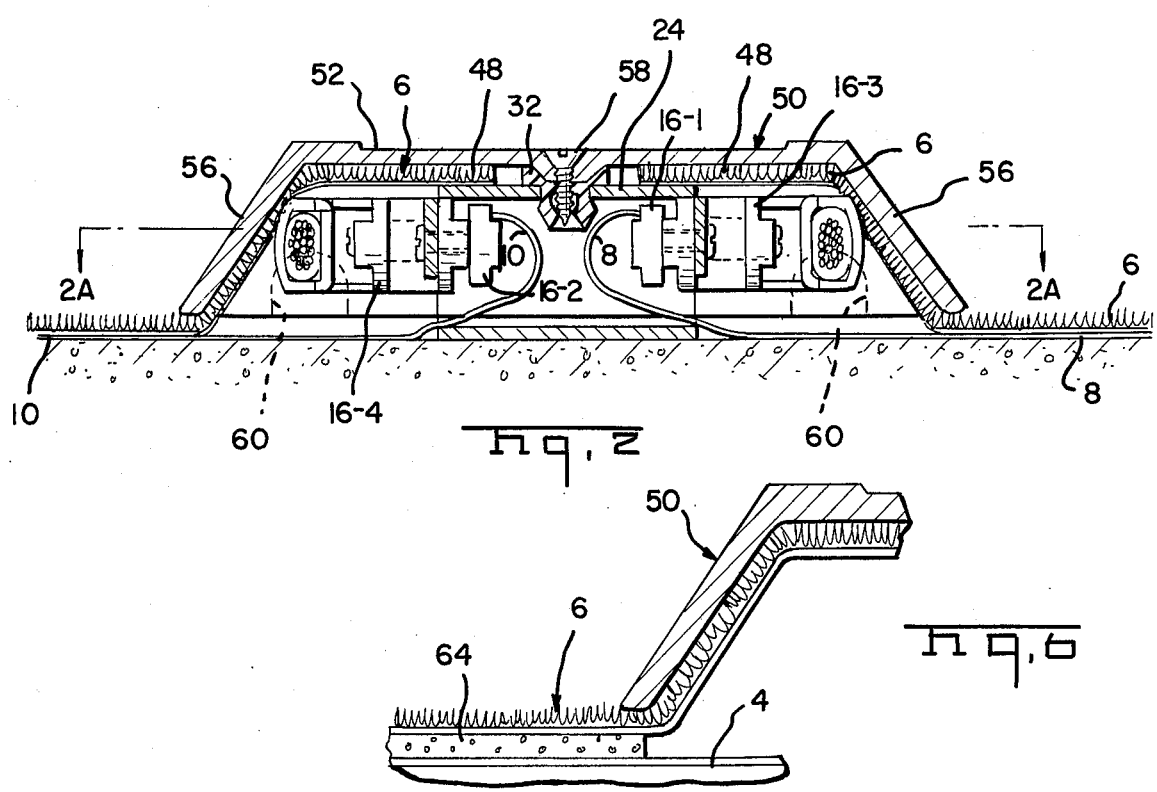

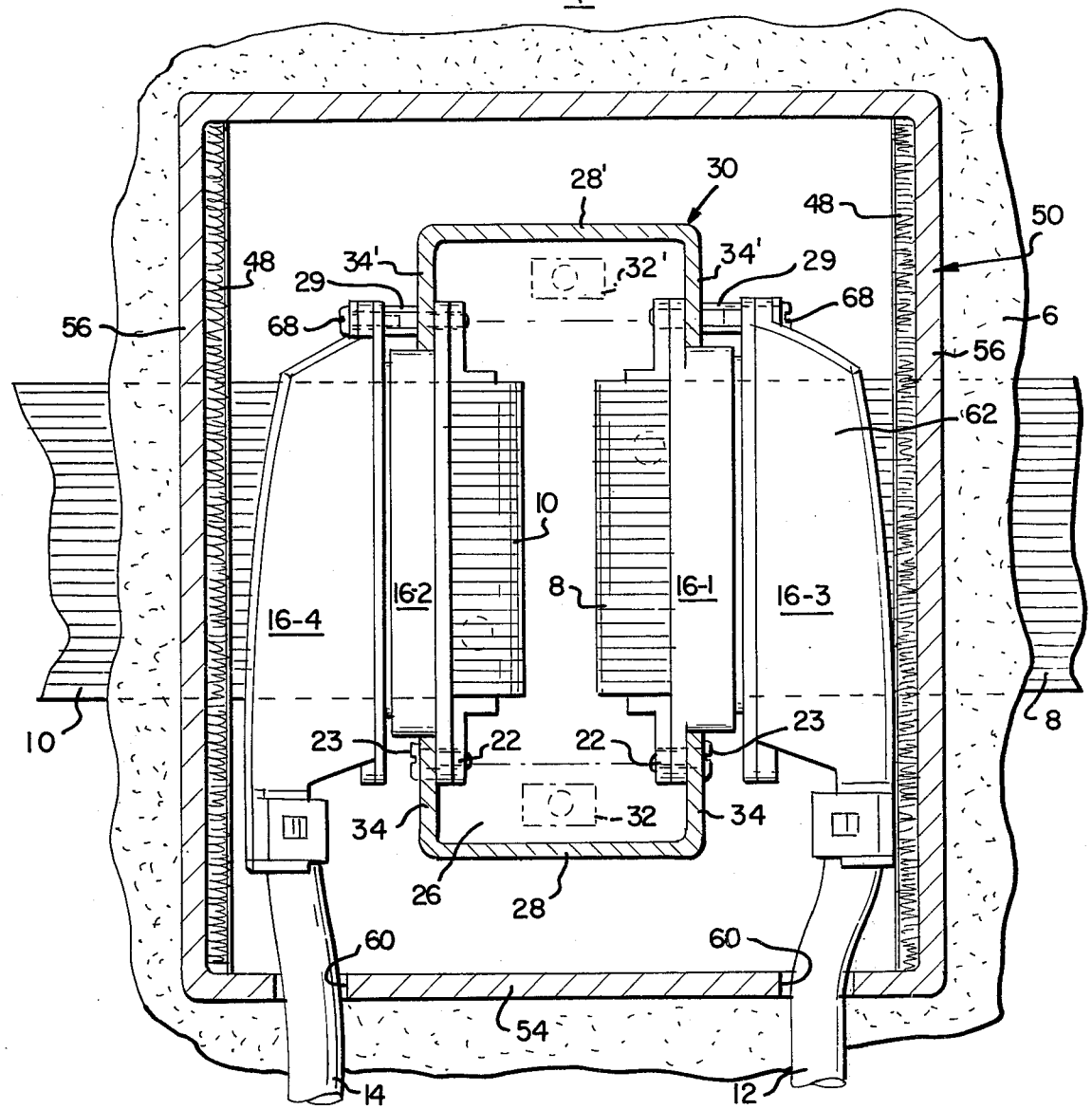
Fig. 2A
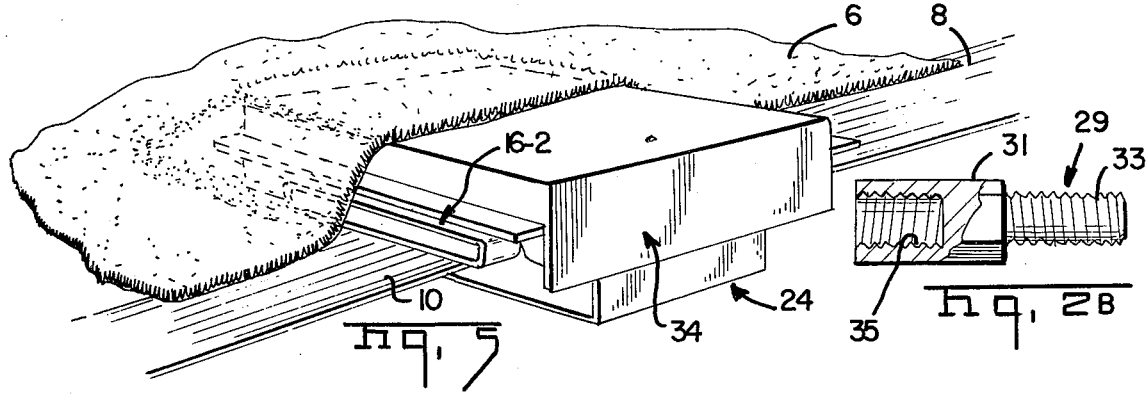
Fig. 5
Fig. 2B

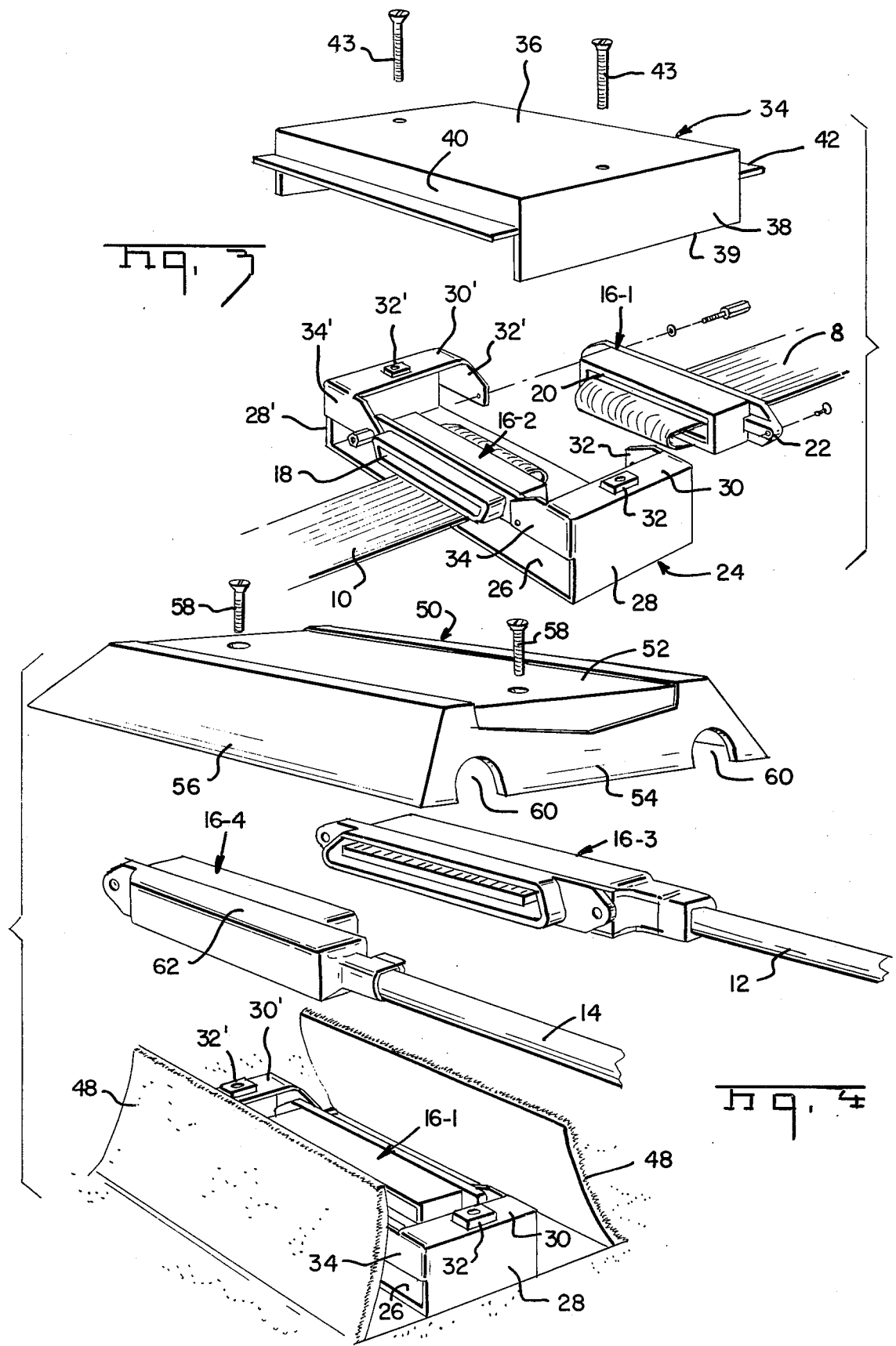

ELECTRICAL CONNECTOR JUNCTION FOR CARPETED FLOOR

BACKGROUND OF THE INVENTION

This invention relates to an electrical junction means for cables which serve as part of a telephone wiring system in a building. The purpose of the junction is to provide electrical connections between flat multi-conductor cables which extend beneath the carpeting on the floor and conventional cables having circular cross sections which extend from the junction to telephone instruments or other telephone equipment.

U.S. Pat. No. 3,934,072 discloses a junction means for flat electric cables which are disposed on the floor of a building beneath the carpeting and cables which extend from the junction to telephone equipment of various types. The obvious advantages of providing the cables for telephone systems beneath the carpeting in a room are inspiring the development of suitable hardware which will permit the use of under-carpet wiring in future construction. When the cables for telephone wiring are provided beneath the carpeting, it is necessary to also provide electrical junctions at which the conductors in the under-carpet cables are connected to cables which extend from the junction to the other telephone equipment such as individual telephone instruments.

The above identified U.S. Pat. No. 3,934,072 has been found to be satisfactory for use when the electrical junction must accomodate a comparatively large number of cables, say five or more cables, but it has a relatively high profile which is sometimes objectionable since it extends from the floor of the room in which it is located and its would be desirable to have available a relatively low profile junction means capable of accomodating one or two cables. The instant invention is directed to the achievement of a low profile junction means for under-carpet wiring systems and is further directed to the achievement of a junction system which has a self-gaging feature. As will be explained in detail below, the term "self-gaging" is used to denote the fact that a cover member for the junction will be clamped against a base plate portion of the junction means in a manner such that it will not become loose on the junction with the passage of time.

It is accordingly an object of the invention to provide an improved electrical junction means for cables notted on a floor beneath carpeting material. A further object is to provide a low profile junction means for under-carpet cables. A still further object is to provide a junction means having a self-gaging feature for the cover member thereof. A still further object is to provide a compact and simple junction means capable of accomodating at least two cables mounted beneath the carpeting on a floor.

These and other objects of the invention are achieved in a preferred embodiment thereof which is briefly described in the foregoing abstract, which is described in detail below, and which is shown in the accompanying drawing in which:

FIG. 1 is a perspective view of an electrical junction means in accordance with the invention.

FIG. 2 is a cross sectional view taken along the lines 2—2 of FIG. 1.

FIG. 2A is a view taken along the lines 2A—2A of FIG. 2.

FIG. 2B shows a mounting screw used in the junctions.

FIG. 3 is a perspective exploded view showing the base frame member which comprises part of the junction means having electrical connectors mounted therein, this view also showing a fixture member which is used to temporarily cover the junction means during the process of installation.

FIG. 4 is a view similar to FIG. 3 but showing the fixture asembled to the base frame member.

FIG. 5 is a view illustrating the manner of cutting flaps in the carpeting which has been installed on the floor to provide access to the junction.

FIG. 6 is a fragmentary view similar to FIG. 2 showing embodiment of the invention.

As shown best in FIG. 1, an electrical junction means 2, in accordance with the invention, is provided on a floor 4 which has been covered with carpeting 6. First and second flat cables 8, 10 extend underneath the carpeting to the junction means 2 and the junction means serves to connect the conductors in the cables 8, 10 to conductors in conventional round wire cables 12, 14. The conductors in the cables 12, 14 may extend to telephone equipment such as telephone desk sets or to junction boxes.

As shown best in FIG. 3, connectors 16-1 and 16-2 are provided on the ends of the cables 8, 10 and the individual conductors in the cables are connected to contact terminals in the two connectors. The connectors 16-1, 16-2 may be of the type shown and described in U.S. Pat. No. 3,760,335 and need not be described in detail here. It will be noted that each connector has a mating side 18, and a rearward side 20; the cables extend to the rearward sides of the connectors and the mating sides are adapted to receive complementary connectors 16-3, 16-4 (FIG. 2A) on the ends of the cables 12, 14. The projecting ends 22 of the housings of the connectors have threaded openings 23 therein for the reception of mounting screws as described below. The connectors 16-3 and 16-4 have back covers 62 thereon and are otherwise similar to the connectors 16-1, 16-2.

It is believed that the structure of the junction means 2 can be best understood from the following description of the manner in which it is assembled during the final stages of finishing a room in a building.

Prior to laying the carpeting in a room, the flat electrical cables 8, 10 are positioned on and, if desired, secured by a bonding agent to the floor of the building. At those locations where it is desired to have a junction means, the electrical connectors 16-1 and 16-2 are installed on the ends of the cables. A base frame member 24 is then positioned on the floor and serves as a mounting means for the connectors 16-1, 16-2. The base frame member may be secured to the floor by fasteners as shown at 25. This base frame member comprises a rectangular base plate 26 having sidewalls 28, 28' extending upwardly from two opposite edges thereof. Flanges 30, 30' extend inwardly and towards each other from the upper ends of the sidewalls and a threaded plastic nut 32 is centrally mounted in an opening in each of the flanges. Ears 32, 34 and 32', 34' extend inwardly from the side edges of each of the sidewalls 28, 28'. The free ends of these ears are provided with openings by means of which the connectors are secured to the ears with fasteners. As clearly shown also in FIG. 3, the cables are reversely flexed adjacent to the rearward sides 20 of the connectors 16-1, 16-2 and the two connectors are secured to the ears in back-to-back relationship so that the cables extend away from the junction as shown in FIG. 1. The lower ends (as viewed in FIG. 2A) of the connectors 16-1, 16-2 are secured to the ears 32, 34 by short screws 23. The upper ends of the connectors as viewed in FIG. 2A are secured to the ears 32', 34' by screws (FIG. 2B) which have elongated heads 31 and threaded shanks 33. The heads 31 of these screws are axially bored and the bores have internal threads as shown at 35. As will be explained below, the internally threaded heads 31 of the screws 29 are utilized to secure the connectors 16-3, 16-4 to the base frame member.

It is contemplated that the base frame member 25 will be mounted on the floor by the telephone installer or other technician who installs the telephone wiring in the room. After he has installed the base frame member and mounted the connectors therein, he assembles a protective fixture 34 on the base frame member (see FIG. 3). This protective fixture has a generally rectangular flat plate section 36 having depending sidewalls 38, 38' extending from two opposite edges thereof. The height of the sidewalls 38, 38' is substantially equal to, and slightly greater than, the height of the sidewalls 28, 28' so that when the fixture is positioned over the base plate member, the lower edges 39 of sidewalls 38, 38' will rest on the floor and the base frame member 24 will thereby be protected. The installation fixture 34 also has short sidewalls or flanges 40 extending downwardly from its remaining side edges and horizontally extending flanges 42 extend from the ends of these short sidewalls. The fixture 34 is secured or assembled to the base frame member by fasteners 43 which extend through openings in the plate like portion 36 of the fixture and into the previously identified plastic nuts 32 in the flanges 30, 30'.

After the under-carpet cables have been placed on the floors and the required number of base frame members installed on the floor with the fixtures 34 thereon, the floor is carpeted as illustrated in FIG. 5. The technician installing the carpeting does not concern himself with the presence of the junction means on the floor but simply lays the carpet over the installation fixtures 34, there will be an obvious bump or mound in the carpeting at the site of each junction since the base frame members, since each junction is protected by an installation fixtures 34, the connectors and the base frame members will not be damaged if they are stepped on or subject to other abuse.

The technician who installs the carpet or a telephone installer, then slits the carpet as shown in FIG. 4 to provide two flaps 48, 48' in the vicinity of each junction means. These flaps are formed by cutting the carpet with a sharp knife along a cutting line which extends across the upper surface 36 of the installation fixtures 34 and then cutting the carpet along cutting lines which extend from each end of the first cut. This operation is an extremely simple one since the technician can determine the proper location for the cuts by feeling the outlines of the fixture 34 through the carpet.

After the carpeting has been installed and the telephone technician undertakes the task of making the final telephone cable connections to the telephone instruments and/or to other telephone junction means, he does so by simply opening the flaps 48, removing the installation fixture 34, and mating the connectors 16-3, 16-4 with the connectors 16-1, 16-2 respectively.

As best shown in FIG. 2A, the connectors 16-3, 16-4 are in an orientation in the junction means such that the ends of the connectors from which the cables 12, 14 extend are adjacent to the sidewall of the cover which has the opening 60 therein and the cables extend directly from the connectors through these openings. After the connectors 16-3, 16-4 have been mated with the connectors 16-1, 16-2, the former connectors are secured in position by short screws 68 which extend through the upper ends (as viewed in FIG. 2A) of connectors 16-3, 16-4 and are threaded into the internally threaded head portions 35 of the screws 29. The lower ends of connectors 16-3, 16-4 are not secured or fastened to the base frame member by screws since these lower ends are not accessible to the technician. However, the lower ends of the connectors are held in position with respect to connectors 16-1, 16-2 by virtue of the fact that the cables extending from these connectors are confined in the openings 60.

After connectors 16-3, 16-4 have been mated with connectors 16-1, 16-2, the technician positions the flaps 48 against the upper surface of the flanges 30, 30' and secures a cover member 50 to the base frame member by means of fasteners 58. The cover member 50 has a substantially flat roof 52 from which sidewalls 54, 56 extend. Notches 66 are provided in one of the sidewalls for the cables 12, 14 as shown in FIGS. 1 and 2A. The sidewalls are inclined outwardly with respect to the plane of the roof 52 to provide a pleasing appearance and the dimensions of the cover member are such that the edges of the sidewalls 54, 56 will bear against portions of the carpet which are adjacent to the base frame member as shown in FIG. 2. In other words, when the fasteners 58 are moved through the openings in the cover member and are threaded into the nuts 32, the flaps 48 of the carpeting will be compressed against the upwardly facing surfaces of the flanges 30, 30' of the base frame member. At the same time, the lower edges of the sidewalls 54, 56 will be compressed against portions of the carpeting which are adjacent to the base frame member. If the carpeting should relax in any way, it will relax in both areas in which it is clamped and because of this fact, the cover member will remain secured to the base frame member.

The disclosed junction means is thus self-gaging in the sense that when the technician secured the cover member to the base frame member by the fasteners 58, he clamps portions of the flaps against the flanges on the base member and at the same time he clamps portions of the carpeting which are adjacent to the base frame member against the floor.

FIG. 6 shows an embodiment in which a pad 64 is provided between the carpeting material and the floor. When padding material of this type is used, it is preferable to cut a rectangular hole in the padding material for the accomodation of the base frame member, alternatively, the padding material can be laid over the cables and over the base frame member and the flaps will then be composed of the padding material as well as the carpeting material. The latter procedure isi practicable only if the padding material is relatively thin.

What is claimed is:

1. Electrical junction means on a carpeted floor for first and second flat cables which extend along said floor and underneath the carpeting means on said floor, said cables having first and second multi-compact electrical connectors on their ends, each of said connectors having a mating side and a rearward side, said cables extending to said rearward sides, said junction means comprising:

- a base frame member comprising a flat sheet metal base plate disposed on said floor, said base plate having upwardly extending sidewalls extending from two opposite edges thereof, said sidewalls having flanges extending inwardly from their upper edges toward each other and parallel to said base plate, each of said sidewalls having mounted ears extending inwardly from its vertically extending side edges,
- said connectors extending between, and being secured to, said mounting ears in back-to-back relationship with said mating sides facing in opposite directions and away from each other, said cables extending from said rearward sides of said connectors and being reversely flexed, said cables extending across said floor away from said base frame member,
- said carpeting having a first slit therein and having at each end of said first slit additional slits extending normally of said first slit in opposite directions, said first slit and said additional slits forming an opening in said carpeting and a pair of flaps on opposite sides edges of said opening, said sidewalls extending through said opening, said flaps extending upwardly from said floor and being supported on said flanges,
- a cover member extending over said flaps, said cover member having depending cover sidewalls, fastening means extending through said cover member and into said flanges, said fastening means serving to clamp said cover member against said flaps and to clamp the free edges of said cover sidewalls against portions of said carpeting which are adjacent to said base frame member.

2. Electrical junction means as set forth in claim 1, said carpeting means consisting of a carpet on said floor.

3. Electrical junction means as set forth in claim 1, said carpeting means consisting of a pad on said floor and a carpet on said pad, said pad having an opening therein, said sidewalls extending through said opening, said slits being in said carpet.

4. Electrical junction means as set forth in claim 1, third and fourth connectors which are complementary to, and mated with, said first and second connectors, and third and fourth cables extending from said third and fourth connectors.

5. Electrical junction means as set forth in claim 4, said third and fourth cables having circular cross sections, one of said cover sidewalls having openings therein, said third and fourth cables extending through said openings and away from said junction means.

* * * * *